United States Patent [19]
Higashijima et al.

[11] Patent Number: 5,519,563
[45] Date of Patent: May 21, 1996

[54] PROTECTION CIRCUIT FOR ELECTRIC CELLS FROM OVERCHARGE AND OVERDISCHARGE USING A PLURALITY OF DETECTION UNITS OF A SINGLE CHIP TYPE

[75] Inventors: Yasuhisa Higashijima; Kyozo Makime, both of Atsugi, Japan

[73] Assignee: Mitsumi Electric Co., Ltd., Tokyo, Japan

[21] Appl. No.: 498,906

[22] Filed: Jul. 6, 1995

[30] Foreign Application Priority Data

Jul. 6, 1994 [JP] Japan ................................. 6-154694

[51] Int. Cl.$^6$ ....................................... H02J 7/04
[52] U.S. Cl. ............................ 361/16; 361/86; 320/40
[58] Field of Search ............................ 361/16, 15, 86; 320/14, 18, 39, 40, 43; 324/434

[56] References Cited

U.S. PATENT DOCUMENTS 5,026,578 4/1993 Nor ................................... 320/18

*Primary Examiner*—Todd DeBoer
*Attorney, Agent, or Firm*—Frishauf, Holtz, Goodman, Langer & Chick

[57] ABSTRACT

In a protection circuit for protecting a plurality of chargeable electric cells by detecting overdischarge and overcharge by detection circuits for respective electric cells to control a protection switch upon detection, the detection circuit is a single chip device comprising an overcharge detection circuit and an overdischarge detection circuit to produce first and second detection signals, respectively, first and second terminals to be connected to an electric cell, third and fourth terminals for receiving first and second input signals, respectively, and fifth and sixth terminals for delivering first and second output signals, respectively. The first input signal and the first detection signal are processed by an OR gate to produce a first processed signal which is delivered to the fifth terminal. The second input signal and the second detection signal are processed by AND gate to produce a second processed signal which is delivered to the sixth terminal. In protection of a plurality of electric cells, the detection units are connected to electric cells, respectively, and connected in a cascaded form so that the first and second output signals from one stage of detection units are transmitted as first and second input signals to the next succeeding stage of the detection units in the cascaded form Accordingly, the overcharge and overdischarge detected in any one of stages are transmitted to the protection switch through the succeeding stages.

7 Claims, 5 Drawing Sheets

5,519,563

PROTECTION CIRCUIT FOR ELECTRIC CELLS FROM OVERCHARGE AND OVERDISCHARGE USING A PLURALITY OF DETECTION UNITS OF A SINGLE CHIP TYPE

BACKGROUND OF THE INVENTION

This invention relates to an electric cell unit comprising chargeable electric cells such as lithium ion electric cells and a protection circuit for protecting the electric cells by detecting overcharge or overdischarge of each of the electric cells and, in particular, to a detection circuit unit to be used in the protection circuit for detecting the overcharge and over discharge of one electric cell.

Among conventional chargeable electric cells, a lithium ion electric cell is particularly weak against overcharge and overdischarge. Therefore, the lithium ion electric cell is essential to be accompanied with the protection circuit for detecting an overcharged condition and an overdischarged condition to stop a charging operation and a discharging operation, respectively. In detail, the lithium ion electric cell (hereinafter called an electric cell) is made to connection to a load or a charging power supply or a charging device through a protection switch and is also connected to the detection circuit which comprises an overcharge detection circuit and an overdischarge detection circuit connected in parallel to each other.

The overcharge detection circuit is for comparing an output voltage or a terminal voltage of the electric cell with a first reference voltage. When the terminal voltage is higher than the first reference voltage, it is determined or judged that the electric cell is overcharged. At that time, the protection switch is turned off so that the electric cell is electrically disconnected from the charging device to stop the charging operation.

On the other hand, the overdischarge detection circuit is for comparing the terminal voltage of the electric cell with a second reference voltage which is lower than the first reference voltage. When the terminal voltage is lower than the second reference voltage, it is determined or judged that the electric cell is overdischarged. At that time, the protection switch is turned off so that the electric cell is electrically disconnected from the load to stop the discharging operation.

In each of the overcharge detection circuit and the overdischarge detection circuit, comparison of the voltages is carried out by the use of a voltage comparing circuit. The voltage comparing circuit comprises a reference voltage generating zener diode connected to a constant-current source, bleeder resistors, and a comparator. A detection accuracy by the voltage comparing circuit is determined by an accuracy of the reference voltage, a resistance ratio of the bleeder resistors, and an offset voltage of the comparator.

In a known electric cell unit of the type having a plurality of electric cells, a plurality of detection circuits are provided for individually monitoring the output voltages of the electric cells, respectively. When overdischarge or overcharge is detected for any one of the electric cells, the protection switch is turned off. Those detection circuits have been formed on a single chip so that the protection circuit can be small-sized, easy in the tramming operation during the production of the detection circuit on the chap, and made with a common reference voltage source circuit for a plurality of detection circuits. Therefore, a two-cell type electric cell unit was provided with a protection circuit exclusively usable for the two-cell type, while a three-cell type electric cell unit was provided with a protection circuit exclusively usable for the three-cell type, for instance the protection circuit for the two-cell type electric cell unit cannot bemused for a protection circuit in the three-cell type electric cell unit. On the contrary, the protection circuit for the three-cell type electric cell unit cannot be used in the two-cell type electric cell unit.

Accordingly, it was required for various electric cell units having different numbers of electric cells that different protection circuits were produced and stored for production and maintenance of the electric cell units.

SUMMARY OF THE INVENTION

It is an object of this invention to provide a detection circuit unit which is a single chip type for detecting overdischarge and overcharge of a single electric cell, a plurality of which can be used in a protection circuit for a plurality of electric cells.

It is another object of this invention to provide a protection circuit for a plurality of electric cells using a plurality of the detection circuit units connected in cascaded connection with one another to control a protection switch to protect the electric cells from overdischarge and overcharge.

The present invention is applicable to a protection circuit for use in protection of first to n-th chargeable electric cells from over-charge and over-discharge, n being an integer of 2 or more, said first to n-th electric cells being connected in series with each other in this order to form a series of electric cell row, said series of electric cell row being connected across a selected one of a load and a charging power supply.

The protection circuit comprises: a first connection member and a second connection member to be connected to opposite terminals of the selected one of the load and the charging power supply, the first connection member being connected to one end electrode of the series of electric cell row; protection switch through which the second connection member is connected to the opposite end electrode of the series of electric cell row, the protection switch connecting the electric cell row to the selected one of the load and the charging power supply when the protection switch is in an ON condition, the protection switch disconnecting the electric cell row from the selected one of the load and the charging power supply to protect the electric cells when the protection switch is in an OFF condition; and first to n-th detection circuit units connected across corresponding ones of the first to n-th electric cells for detecting overdischarge and overcharge of the corresponding electric cells, respectively.

Each of the first to n-th detection circuit units being a single chip device which comprises: a first terminal and a second terminal to be connected to opposite electrodes of the corresponding one of the first to n-th electric cells, respectively, for receiving an output voltage across the opposite electrodes of the corresponding electric cell; a third terminal and a fourth terminal for receiving a first and a second input signals, respectively; a fifth and a sixth terminals for delivering a first and a second output signals, respectively; a seventh and an eighth terminals for delivering a third and a fourth output signals corresponding to the first and the second output signals, respectively; an overcharge detection circuit connected between the first and the second terminals for detecting whether or not the output voltage is higher than a first reference voltage having a first reference voltage level to produce a first detection signal, the first detection signal being representative of an overcharge detection signal when the output voltage is higher than the first reference voltage an overdischarge detection circuit connected between the first and the second terminals for detecting whether or not the output voltage is lower than a second reference voltage having a second reference voltage level which is lower than the first reference voltage level to produce a second detection signal, the second detection signal being representative of an overdischarge detection signal when the output voltage is lower than the second reference voltage; a first processing circuit coupled to the third terminals, the overcharge detection circuit, the fifth terminal and the seventh terminal for processing the first input signal and the first detection signal to produce a first processed signal, the first processed signal being provided to the fifth terminal and the seventh terminal as the first output signal and the third output signal, the first output signal and the third output signal being representative of the overcharge detection signal when any one of the first input signal and the first detection signal is representative of the overcharge detection signal; and a second processing circuit coupled to the fourth terminal, the overdischarge detection circuit, the sixth terminal and the eighth terminal for processing the second input signal and the second detection signal to produce a second processed signal, the second processed signal being provided to the sixth terminal and the eighth terminal as the second output signal and the fourth output signal, the second output signal and the fourth output signal being representative of the overdischarge detection signal when any one of the second input signal and the second detection signal is representative of the overdischarge detection signal.

The fifth and the sixth terminals of a m-th one of the first to n-th detection circuit units, m being an integer equal to 1 or more but smaller than n, being connected to the the third and the fourth terminals of a (m+1)-th one of the first to n-th detection circuit units, respectively. The seventh and the eighth terminals of the n-th detection circuit unit being coupled to the protection switching means, the protection switch being turned into the OFF condition when the third output signal the seventh terminal is representative of the overcharge detection signal or when the fourth output signal the eighth terminal is representative of the overdischarge detection signal.

In the protection circuit, the third and the fourth terminals of the first detection circuit unit may be commonly connected to the first terminal of the first detection circuit unit.

In the protection circuit unit, the fifth and the sixth terminals of the n-th detection circuit unit may be commonly connected to the second terminal of the n-th detection circuit unit.

In the protection circuit unit, the protection switch mat comprise first and second switching elements connected in series with each other, the first switching element being controlled by the third output signal from the n-th detection circuit unit, the second switching element being controlled by the fourth output signal from the n-th detection circuit unit.

In the protection circuit, the second detection signal may be a low level signal when the overdischarge is detected, but is a high level signal when overdischarge is not detected.

DESCRIPTION OF PREFERRED EMBODIMENTS

Prior to describing an embodiment of this invention, for the good understanding of this invention, description will be made as regards conventional projection circuit for protecting a plurality of chargeable electric cells from overdischarge and overcharge with reference to FIG. 1.

Figure 1:
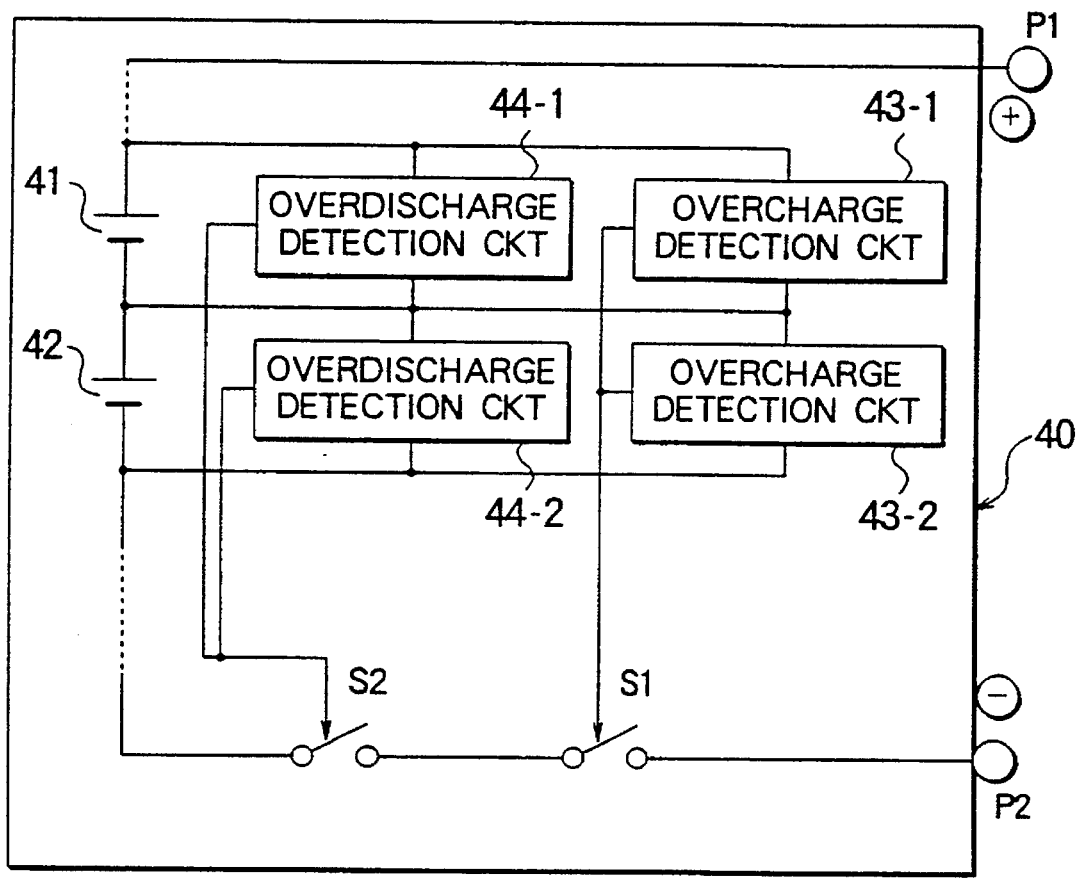
FIG. 1 is a schematic diagram view showing a conventional protection circuit for a plurality of electric cells.

Referring to FIG. 1. an electric cell unit 40 shown therein comprises a plurality of lithium ion electric cells 41 and 42 (two of cells are shown) and a protection circuit. The two lithium ion electric cells 41 and 42 (hereinafter called an electric cell) are connected in cascade to or series with each other, but the number of the electric cells may be one or three or more. The electric cells 41 and 42 are connected in parallel to overcharge detection circuits 43-1 and 43-2, respectively, and to overdischarge detection circuits 44-1 and 44-2, respectively.

The overcharge detection circuits 43-1 and 43-2 compare terminal voltages of the electric cells 41 and 42 with a first reference voltage, respectively. When the terminal voltage of any one of the electric cells is higher than the first reference voltage, an overcharged condition of the one electric cell is determined. Thus, any/one of the overcharge detection circuits 43-1 and 43-2 produces an overcharge detection signal to turn off a protection switch S1. As a result, a charging device is electrically disconnected from terminals P1 and P2 to stop a charging operation for the electric cells.

On the other hand, the overdischarge detection circuits 44-1 and 44-2 compare the terminal voltages of the electric cells 41 and 42 with a second reference voltage lower than the first reference voltage, respectively. When the terminal voltage of any one of the electric cells is lower than the second reference voltage, an overdischarged condition of the one electric cell is judged. Thus, an overdischarge detection signal is delivered to a protection switch S2 and turns off the protection switch S2. Accordingly, a load is electrically disconnected from the terminals P1 and P2 to stop a discharging operation of the electric cells.

Figure 2:
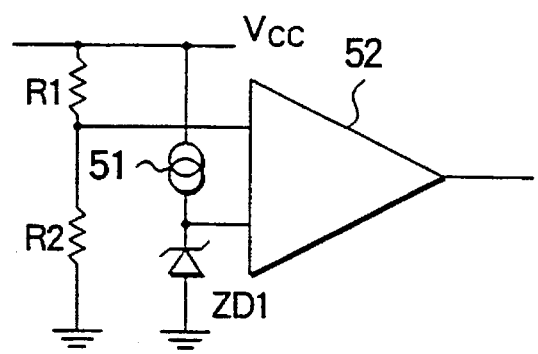
FIG. 2 is a circuit diagram view showing a voltage comparing circuit used in an overcharge detection circuit illustrated in FIG. 1.

In each of the overcharge detection circuits 43-1 and 43-2 and the overdischarge detection circuits 44-1 and 44-2, comparison of the voltages is carried out by the use of a voltage comparing circuit as illustrated in FIG. 2. The voltage comparing circuit has a reference voltage generating Zener diode ZD1 connected to a constant-current source 51, bleeder resistor R1 an R2, and a comparator 52. The comparing circuit has a detection accuracy determined by an accuracy of the reference voltage, a resistance ratio of the bleeder resistors R1 and R2, and an offset voltage of the comparator 52.

As mentioned in the preamble, all of the overcharge and overdischarge detection circuits are usually formed on a one chip to form an IC device of a single chip type, in the prior art.

Figure 3:
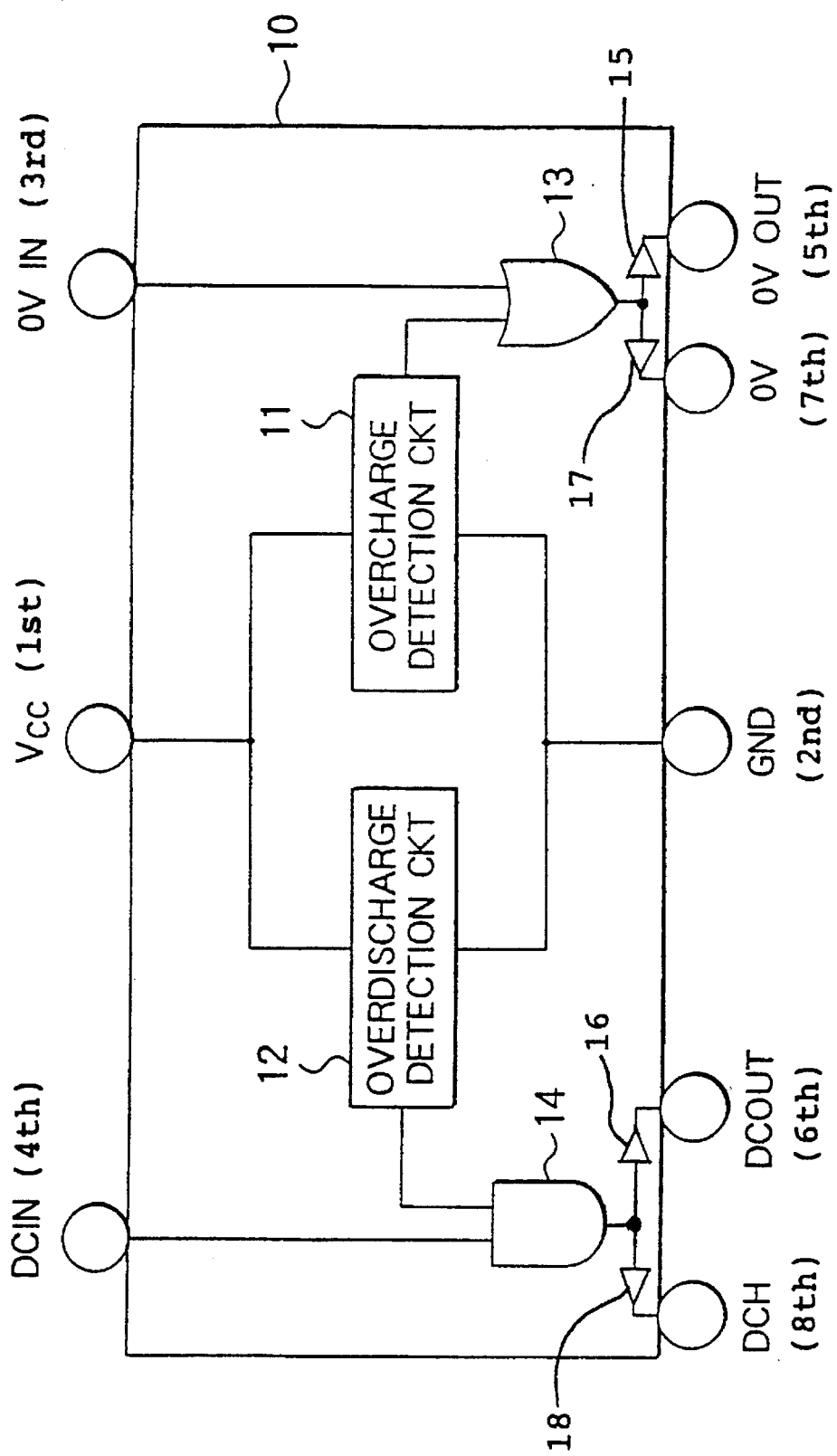
FIG. 3 is a schematic diagram view showing a detection circuit unit for detecting overcharge and overdischarge of a single electric cell according to one embodiment of the present invention.

With reference to FIG. 3, description will now be made as regards a detection circuit unit 10 (hereinafter abbreviated as a detection unit) according to this invention. The detection unit 10 is for use in one-to-one corresponding relationship with each one of chargeable electric cells such as a lithium ion electric cells used in an electric cell unit. The detection unit 10 comprises an overcharge detection circuit 11 and an overdischarge detection circuit 12 and, in addition that, also comprises a first processing circuit which is shown by a two-input OR gate 13 and a second processing circuit which is shown by a two-input AND gate 14 as output circuit portions thereof.

Also, the detection unit 10 comprises a first terminal Vcc and a second terminal GND for connecting the overcharge detection circuit 11 and the overdischarge detection circuit 12 to the opposite electrodes, that is, the plus side and the minus side of an electric cell (not shown), respectively. The detection unit 10 further comprises, on an assumption that a plurality of detection units are used in a cascaded connection for a plurality of electric cells, a third terminal OVIN for receiving a first input signal or an overcharge detection signal delivered from a detection circuit at a preceding stage and a fourth terminal DCIN for receiving a second input signal or an overdischarge detection signal delivered from the preceding stage.

The overcharge detection circuit 11 compares a terminal voltage of the electric cell connected between the first terminal Vcc and the second terminal GND with a first reference voltage and produces a first detection signal. When the terminal voltage is higher than the first reference voltage, the first detection signal is representative of an overcharged condition and is an overcharge detection signal. On the other hand, the overdischarge detection circuit 12 compares the terminal voltage of the electric cell connected between the first terminal Vcc and the second terminal GND with a second reference voltage and produces a second detection signal. When the terminal voltage is lower than the second reference voltage, second detection signal is representative of an overdischarged condition and is an overdischarge detection signal.

Particularly, in this invention, the overcharge detection signal is defined by a high level (logical value 1) and the overdischarge detection signal is defined by a low level logical value (logical value 0).

The detection unit 10 is further provided with fifth and sixth terminals OVOUT and DCOUT delivering first and second output signals which are the first and the second processed signals fed from the first and the second processing circuits 13 and 14 through first and second buffer circuits 15 and 16, respectively.

The detection unit 10 is further provided with seventh and eighth terminals OV and DCH delivering third and fourth output signals which are also the first and the second processed signals fed from the first and the second processing circuits 13 and 14 through third and fourth buffer circuits 17 and 18, respectively.

When the overcharge detection signal is applied from another detection unit through the third terminal OVIN and/or when the overcharge detection signal is delivered from the overcharge detection circuit 11, the overcharge detection signal is output from the fifth terminal OVOUT and the seventh terminal OV through the OR gate 13 to the outside. On the other hand, when the overdischarge detection signal is applied from another detection unit through the fourth terminal DCIN and/or when the overdischarge detection signal is delivered from the overdischarge detection circuit 12, the overdischarge detection signal is output from the sixth terminal DCOUT and the eighth terminal DCH through the AND gate 14 to the outside. The above-mentioned detection unit is implemented by a single-chip IC.

In case where the detection unit 10 is independently used, it is only required that the first terminal Vcc and the second terminal GND are connected to the plus side of the electric cell and to the minus side of the electric cell, respectively. It is also required that one of the fifth terminal OVOUT and the seventh terminal OV is connected to the first switch element (S1 in FIG. 1) of the protection switch. One of the sixth terminal DCOUT and the eighth terminal DCH is also connected to the second switch element (S2 in FIG. 1) of the protection switch. The first switch element is turned off by the high level of the overcharge detection signal and the second switch element is turned off by the low level of the overdischarge detection signal. This is because, in the overcharged condition, it is necessary to consume an electric power as much as possible within the circuit so as to lower the voltage. On the other hand, this is because when the overdischarged condition is detected, the overdischarge detection circuit 12 stops its operation to reduce electric power consumption as much as possible so as to prevent a voltage drop of the electric cell.

Figure 4:
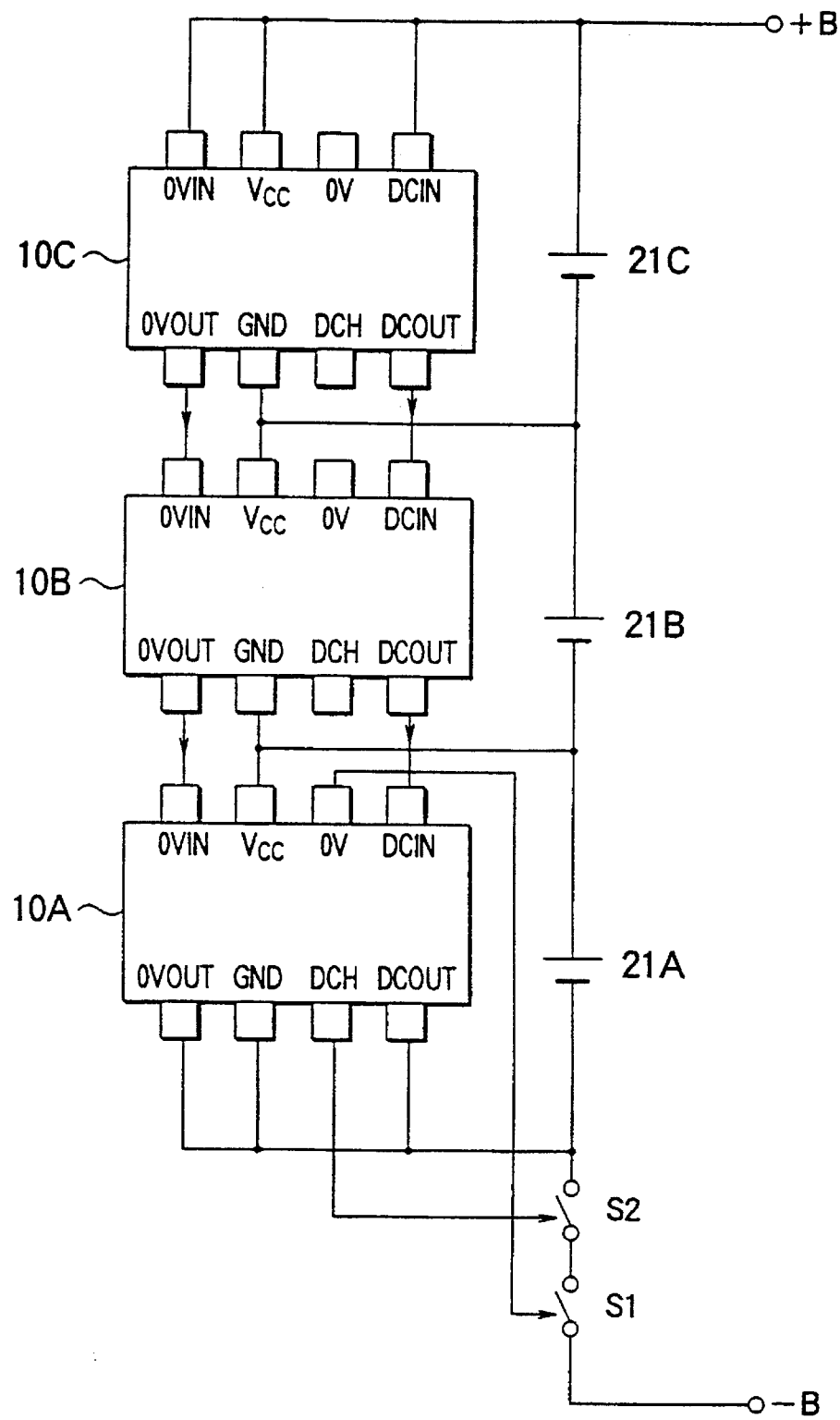
FIG. 4 is a schematic diagram view showing a protection circuit for a plurality of electric cells according to one embodiment, using a plurality of detection circuits units of FIG. 3.
Figure 5:
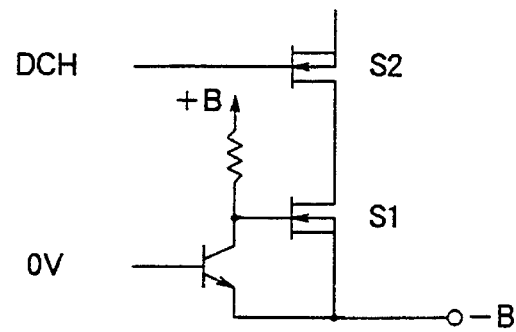
FIG. 5 is a circuit diagram of an example of the protection switch shown in FIG. 4.

With reference to FIGS. 4 and 5, description will be made as regards a protection circuit using three stages 10A–10C of the detection unit illustrated in FIG. 3. The protection circuit shown therein is for first to third electric cells 21C, 21B, and 21A connected in cascade to each other. In the detection unit 10C at the uppermost stage of the first stage, third terminal OVIN, first terminal Vcc, and fourth terminal DCIN are commonly connected to the plus side of the first electric cell 21C. The fifth terminal OVOUT and sixth terminal DCOUT are connected to third terminal OVIN and fourth terminal DCIN of the detection unit 10B at the next stage or second stage, respectively. In addition, the second terminal GND of the first stage detection unit 10C and the first terminal Vcc of the second stage detection unit 10B are connected to a common connection point of the plus side of the second electric cell 21B and the minus side of the first electric cell 21C0 respectively. In addition, fifth terminal OVOUT and sixth terminal DCOUT of the second stage are connected to third terminal OVIN and fourth terminal DCIN of the lowermost or third stage detection unit 10A, respectively.

In the third detection unit 10A, first terminal Vcc and second terminal GND are connected to the plus side and the minus side of the third electric cell 21A, respectively. The fifth terminal OVOUT and sixth terminal DCOUT are also connected to the minus side of the third electric cell 21A. In addition, seventh terminal OV and eighth terminal DCH of the third stage 10A are connected to the first switch element S1 and the second switch element S2 of the protection switch, respectively.

The output circuit portion of the overcharge detection circuit or the first processing circuit in each of the detection units 10A to 10C is formed by the OR gate 13. Therefore, when the overcharged condition is detecteft at at least one of the detection units, for example, at the first detection unit 10C, the overcharge detection signal is delivered from the first detection unit 10C to the switch element S1 through each of the output circuit portions in the detection units 10B and 10A. Thus, the switch element S1 is turned off to stop the charging operation.

On the other hand, the output circuit portion or the second processing circuit of the overdischarge detection circuit of each of the detection units 10A to 10C is formed by the AND gate 14 and an overdischarge detection signal is defined by the low level. Therefore, when the overdischarged condition is detected at at least one of the detection units, for example, at the second detection unit 10B, an output level of the AND gate 14 at the second detection unit 10B becomes a low level so that the second output signal from the sixth terminal DCOUT also becomes the low level. Therefore, one of inputs of the AND gate 14 at the third detection unit 10A, specifically, the input signal from the fourth terminal DCIN becomes the low level. As a result, the second processed signal of the AND gate 14 in the third detection unit 10A becomes the low level and lowers a level of the fourth output signal from the eighth terminal DCH at the third detection unit 10A. Thus, the switch element S2 is turned off to stop the discharging operation.

Both of the switch elements S1 and S2 can be formed by FETs. In order to turn off the switch elements S1 and S2 by the high anti the low level signals, respectively, the protection switch is required to have a structure as illustrated in FIG. 5, for instance.

The connection of each terminals in the third and first detection units 10A and 10C is not restricted to the connection illustrated in FIG. 4. Specifically, it is preferable that, at the first detection unit 10C, the first terminal Vcc is connected to the power supply line of the plus side of the first electric cell 21C at the most upper column and the third terminal OVIN and the fourth terminal DCIN are connected to the power supply line of the plus side or the minus side of the first electric cell 21C. While, at the third detection unit 10A, the second terminal GND is connected to the power supply line of the minus side of the third electric cell 21A and the fifth and the sixth terminals OVOUT and DCOUT are opened or connected to the power supply line of the minus side of the third electric cell 21A. For example, at the first detection unit 10C, the terminal Vcc alone is connected to the plus side of the first electric cell 21C while the third and fourth terminals OVIN and DCIN are connected to the minus side of the first electric cell 21C.

On the other hand, at the third detection unit 10A, the second terminal CND alone is connected to the minus side of the third electric cell 21A, while the fifth and the sixth terminals OVOUT and DCOUT are opened.

Figure 6:
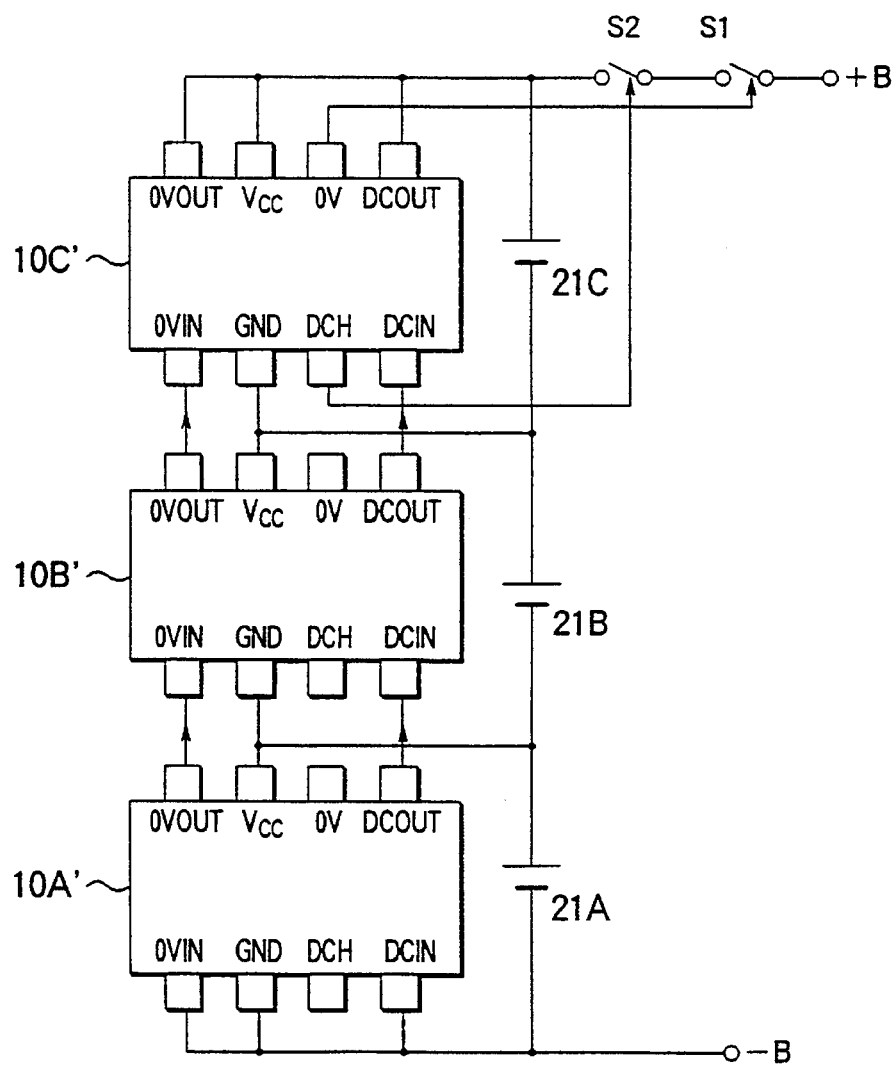
FIG. 6 is a schematic diagram view showing a protection circuit according to another embodiment using a plurality of detection circuit units of FIG. 3.

Referring to FIG. 6, the embodiment shown therein is characterized In that switches S1 and S2 are disposed In a power supply line of the plus side +B. In this embodiment, at each of the first to third detection units 10A' to 10C', connections between third and fifth terminals OVIN and OVOUT and between fourth and sixth terminals DCIN and DCOUT are in a reversed relationship to that in FIG. 4. In this embodiment, operation is similar to that in FIG. 4 except that on- and off-control signals for controlling the protection switch of S1 and S2 are delivered to the plus side of the first electric cell 21C from the first detection unit 10C'.

In the detection unit 10, the first and the second processing circuits can be made by use of digital logic circuits such as OR circuits and/or AND circuits. However, those circuits can be realized by use of analog circuits.

Figure 7:
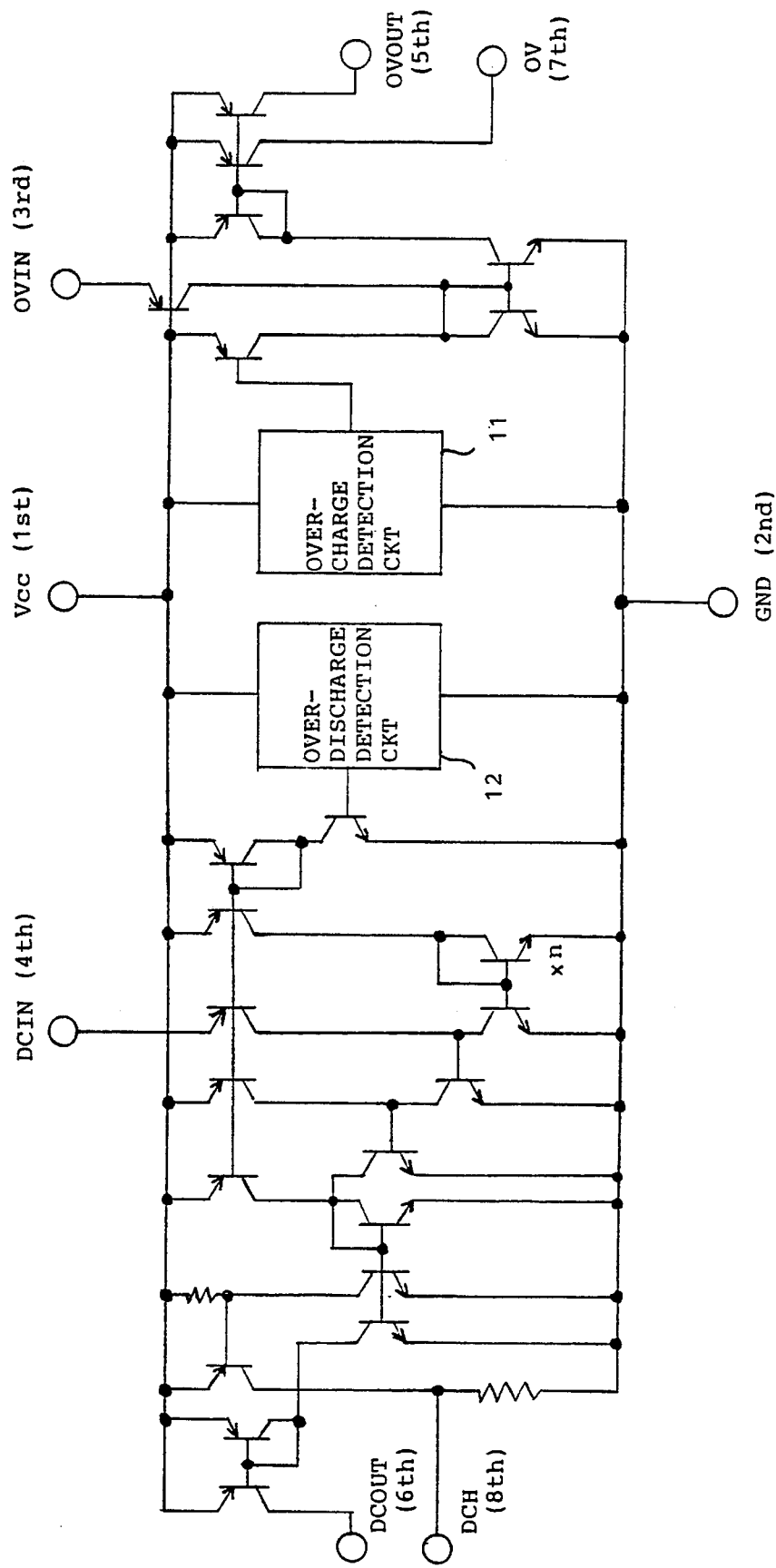
FIG. 7 is a circuit diagram view of an example of the detection circuit unit of FIG. 3.

Referring to FIG. 7, the detection circuit unit 10 is shown which is realized in an analog circuit form. It is believed that the arrangement and operation of the circuit can be understood by those skilled in the art from the figures. Therefore, description thereto is omitted herein.

As described above, the protection circuit according to this invention can be used as a single stage for a single electric cell or as a cascaded connection of a plurality of detection units for a plurality of electric cells.

Therefore, it is possible to supply a protection circuit by combining detection units regardless of the number of the electric cells.

What is claimed is:

1. A protection circuit for use in protection of first to n-th chargeable electric cells from over-charge and over-discharge, n being an integer of 2 or more, said first to n-th electric cells being connected in series with each other in this order to form a series of electric cell row, said series of electric cell row being connected across a selected one of a load and a charging power supply, which comprises:

a first connection member and a second connection member to be connected to opposite terminals of said selected one of the load and the charging power supply, said first connection member being connected to one end electrode of said series of electric cell row;

protection switching means through which said second connection member is connected to the opposite end electrode of said series of electric cell row, said protection switching means connecting said electric cell row to said selected one of said load and said charging power supply when said protection switch is in an ON condition, said protection switching means disconnecting said electric cell row from said selected one of said load and said charging power supply to protect said electric cells when said protection switch is in an OFF condition; and first to n-th detection circuit units connected across corresponding ones of said first to n-th electric cells for detecting overdischarge and overcharge of the corresponding electric cells, respectively;

each of said first to n-th detection circuit units being a single chip device which comprises:

a first terminal and a second terminal to be connected to opposite electrodes of the corresponding one of said first to n-th electric cells, respectively, for receiving an output voltage across the opposite electrodes of said corresponding electric cell;

a third terminal and a fourth terminal for receiving a first and a second input signals, respectively;

a fifth and a sixth terminals for delivering a first and a second output signals, respectively;

a seventh and an eighth terminals for delivering a third and a fourth output signals corresponding to said first and said second output signals, respectively;

an overcharge detection circuit connected between said first and said second terminals for detecting whether or not said output voltage is higher than a first reference voltage having a first reference voltage level to produce a first detection signal, said first detection signal being representative of an overcharge detection signal when said output voltage is higher than said first reference voltage;

an overdischarge detection circuit connected between said first and said second terminals for detecting whether or not said output voltage is lower than a second reference voltage having a second reference voltage level which is lower than said first reference voltage level to produce a second detection signal, said second detection signal being representative of an overdischarge detection signal when said output voltage is lower than said second reference voltage;

a first processing circuit coupled to said third terminals, said overcharge detection circuit, said fifth terminal and said seventh terminal for processing said first input signal and said first detection signal to produce a first processed signal, said first processed signal being provided to said fifth terminal and said seventh terminal as said first output signal and said third output signal, said first output signal and said third output signal being representative of said overcharge detection signal when any one of said first input signal and said first detection signal is representative of said overcharge detection signal; and a second processing circuit coupled to said fourth terminal, said overdischarge detection circuit, said sixth terminal and said eighth terminal for processing said second input signal and said second detection signal to produce a second processed signal, said second processed signal being provided to said sixth terminal and said eighth terminal as said second output signal and said fourth output signal, said second output signal and said fourth output signal being representative of said overdischarge detection signal when any one of said second input signal and said second detection signal is representative of said overdischarge detection signal;

said fifth and said sixth terminals of a m-th one of said first to n-th detection circuit units, m being an integer equal to 1 or more but smaller than n, being connected to said said third and said fourth terminals of a (m+1)-th one of said first to n-th detection circuit units, respectively; and said seventh and said eighth terminals of said n-th detection circuit unit being coupled to said protection switching means, said protection switching means being turned into said OFF condition when said third output signal said seventh terminal is representative of said overcharge detection signal or when said fourth output signal said eighth terminal is representative of said overdischarge detection signal.

2. A protection circuit as claimed in claim 1, wherein said third and said fourth terminals of said first detection circuit unit are commonly connected to said first terminal of said first detection circuit unit.

3. A protection circuit as claimed in claim 1, wherein said fifth and said Sixth terminals of said n-th detection circuit unit are commonly connected to said second terminal of said n-th detection circuit unit.

4. A protection circuit as claimed in claim 1, wherein said protection switching means comprises first and second switching elements connected in series with each other, said first switching element being controlled by said third output signal from said n-th detection circuit unit, said second switching element being controlled by said fourth output signal from said n-th detection circuit unit.

5. A protection circuit as claimed in claim 1, wherein said second detection signal is a low level signal when said overdischarge is detected, but is a high level signal when overdischarge is not detected.

6. An electric cell unit comprising:

first to n-th, n being an integer of 2 or more, chargeable electric cells being connected in series with one another to form a series of electric cell row, said series of electric cell row being connected to across a selected one of a load and a charging power supply; and a protection circuit for protecting said first to n-th electric cells from overdischarge and overcharge, said protection circuit comprising:

a first connection member and a second connection member to be connected to opposite terminals of said selected one of the load and the charging power supply, said first connection member being connected to one end electrode of said series of electric cell row;

protection switching means through which said second connection member is connected to the opposite end electrode of said series of electric cell row, said protection switching means connecting said electric cell row to said selected one of said load and said charging power supply when said protection switch is in an ON condition, said protection switching means disconnecting said electric cell row from said selected one of said load and said charging power supply to protect said electric cells when said protection switch is in an OFF condition; and first to n-th detection circuit units connected across corresponding ones of said first to n-th electric cells for detecting overdischarge and overcharge of the corresponding electric cells, respectively;

each of said first to n-th detection circuit units being a single chip device which comprises;

a first terminal and a second terminal to be connected to opposite electrodes of the corresponding one of said first to n-th electric cells, respectively, for receiving an output voltage across the opposite electrodes of said corresponding electric cell;

a third terminal and a fourth terminal for receiving a first and a second input signals, respectively;

a fifth and a sixth terminals for delivering a first and a second output signals, respectively;

a seventh and an eighth terminals for delivering a third and a fourth output signals corresponding to said first and said second output signals, respectively;

an overcharge detection circuit connected between said first and said second terminals for detecting whether or not said output voltage is higher than a first reference voltage having a first reference voltage level to produce a first detection signal, said first detection signal being representative of an overcharge detection signal when said output voltage is higher than said first reference voltages;

an overdischarge detection circuit connected between said first and said second terminals for detecting whether or not said output voltage is lower than a second reference voltage having a second reference voltage level which is lower than said first reference voltage level to produce a second detection signal, said second detection signal being representative of an overdischarge detection signal when said output voltage is lower than said second reference voltage;

a first processing circuit coupled to said third terminals, said overcharge detection circuit, said fifth terminal and said seventh terminal for processing said first input signal and said first detection signal to produce a first processed signal, said first processed signal being provided to said fifth terminal and said seventh terminal as said first output signal and said third output signal, said first output signal and said third output signal being representative of said overcharge detection signal when any one of said first input signal and said first detection signal is representative of said overcharge detection signal; and a second processing circuit coupled to said fourth terminal, said overdischarge detection circuit, said sixth terminal and said eighth terminal for processing said second input signal and said second detection signal to produce a second processed signal, said second processed signal being provided to said sixth terminal and said eighth terminal as said second output signal and said fourth output signal, said second output signal and said fourth output signal being representative of said overdischarge detection signal when any one of said second input signal and said second detection signal is representative of said overdischarge detection signals;

said fifth and said sixth terminals of a m-th one of said first to n-th detection circuit units, m being an integer equal to 1 or more but smaller than n, being connected to said said third and said fourth terminals of a (m+1)-th one of said first to n-th detection circuit units respectively; and said seventh and said eighth terminals of said n-th detection circuit unit being coupled to said protection switching means said protection switching means being turned into said OFF condition when said third output signal said seventh terminal is representative of said overcharge detection signal or when said fourth output signal said eighth terminal is representative of said overdischarge detection signal.

7. A detection circuit unit of a single chip type for detecting overdischarge and overcharge of an electric cell for use in protection of a plurality of electric cells connected in series with each other from overdischarge and overcharge, which comprises:

- a first terminal and a second terminal to be connected to opposite electrodes of the electric cells, respectively, for receiving an output voltage across the opposite electrodes of said electric cell;
- a third terminal and a fourth terminal for receiving a first and a second input signals, respectively;
- a fifth and a sixth terminals for delivering a first and a second output signals, respectively;
- a seventh and an eighth terminals for delivering a third and a fourth output signals corresponding to said first and said second output signals, respectively;
- an overcharge detection circuit connected between said first and said second terminals for defecting whether or not said output voltage is higher than a first reference voltage having a first reference voltage level to produce a first detection signal, said first detection signal being representative of an overcharge detection signal when said output voltage Is higher than said first reference voltage;
- an overdischarge detection circuit connected between said first and said second terminals for detecting whether or not said output voltage is lower than a second reference voltage having a second reference voltage level which is lower than said first reference voltage level to produce a second detection signal, said second detection signal being representative of an overdischarge detection signal when said output voltage is lower than said second reference voltage;
- a first processing circuit coupled to said third terminals, said overcharge detection circuit, said fifth terminal and said seventh terminal for processing said first input signal and said first detection signal to produce a first processed signal, said first processed signal being provided to said fifth terminal and said seventh terminal as said first output signal and said third output signal said first output signal and said third output signal being representative of said overcharge detection signal when any one of said first input signal and said first detection signal is representative of said overcharge detection signal; and
- a second processing circuit coupled to said fourth terminal, said overdischarge detection circuit, said sixth terminal and said eighth terminal for processing said second input signal and said second detection signal to produce a second processed signal, said second processed signal being provided to said sixth terminal and said eighth terminal as said second output signal and said fourth output signal, said second output signal and said fourth output signal being representative of said overdischarge detection signal when any one of said second input signal and said second detection signal is representative of said overdischarge detection signal.

* * * * *